United States Patent [19]

Takano et al.

[11] 4,307,576
[45] Dec. 29, 1981

[54] AIR CONDITIONING SYSTEM HAVING A PLURALITY OF INDOOR UNITS

[75] Inventors: Teruhisa Takano; Hiroshi Fujieda; Katsumi Ishii; Michimasa Hori, all of Kadoma, Japan

[73] Assignee: Matsushita Electric Industrial Co., Ltd., Osaka, Japan

[21] Appl. No.: 84,774

[22] Filed: Oct. 15, 1979

[30] Foreign Application Priority Data

Oct. 19, 1978 [JP] Japan .................................. 53-129129
Oct. 19, 1978 [JP] Japan .................................. 53-129130

[51] Int. Cl.³ .......................... F25B 41/04; F25B 19/00
[52] U.S. Cl. ......................................... 62/204; 62/231; 165/12
[58] Field of Search ........................... 62/203, 204–213, 62/231 X, 228 B; 165/12–22, 231; 340/309.1; 364/108, 557; 336/1 B, 46 R, 46 F, 78 R

[56] References Cited

U.S. PATENT DOCUMENTS 3,922,535 11/1975 Randolph ........................ 364/557 X
4,084,388 4/1978 Nelson ............................. 165/22 X
4,192,455 3/1980 Rasmussen ........................ 165/22 X Primary Examiner—William E. Wayner
Attorney, Agent, or Firm—Lowe, King, Price & Becker

[57] ABSTRACT

An air conditioning system comprises an outdoor unit and a plurality of indoor units, a plurality of delivery conduits for supplying working fluid from a variable capacity energy source located in the outdoor unit to the indoor units, and a plurality of control valves respectively provided in the delivery conduits. A temperature sensor and a reference temperature setting device are provided for each room for transmitting corresponding temperature data to a central control unit. The central control unit detects whether the sensed temperature of each room is increasing or decreasing as a function of time and whether the sensed temperature is above or below a predetermined temperature associated with a value established by the reference setting device. Based upon these data the central control unit provides a control signal for closing the valve to divert a certain amount of the total supply energy to other rooms. Another control signal is generated to increase the total amount of supply energy when the temperature level and its gradient of each room indicate a shortage of the total supply energy and to decrease the total amount when a total energy supply excess is indicated.

27 Claims, 13 Drawing Figures

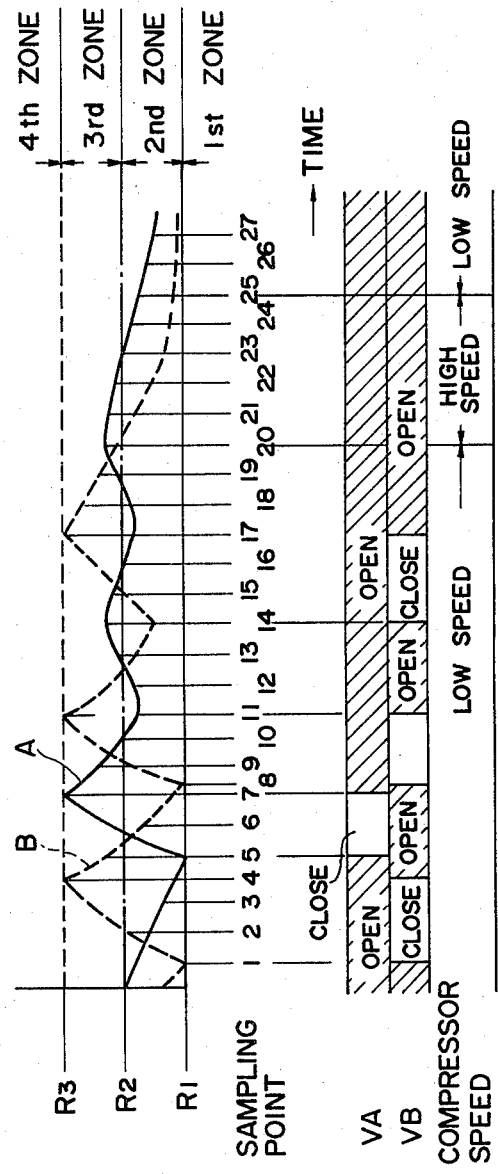

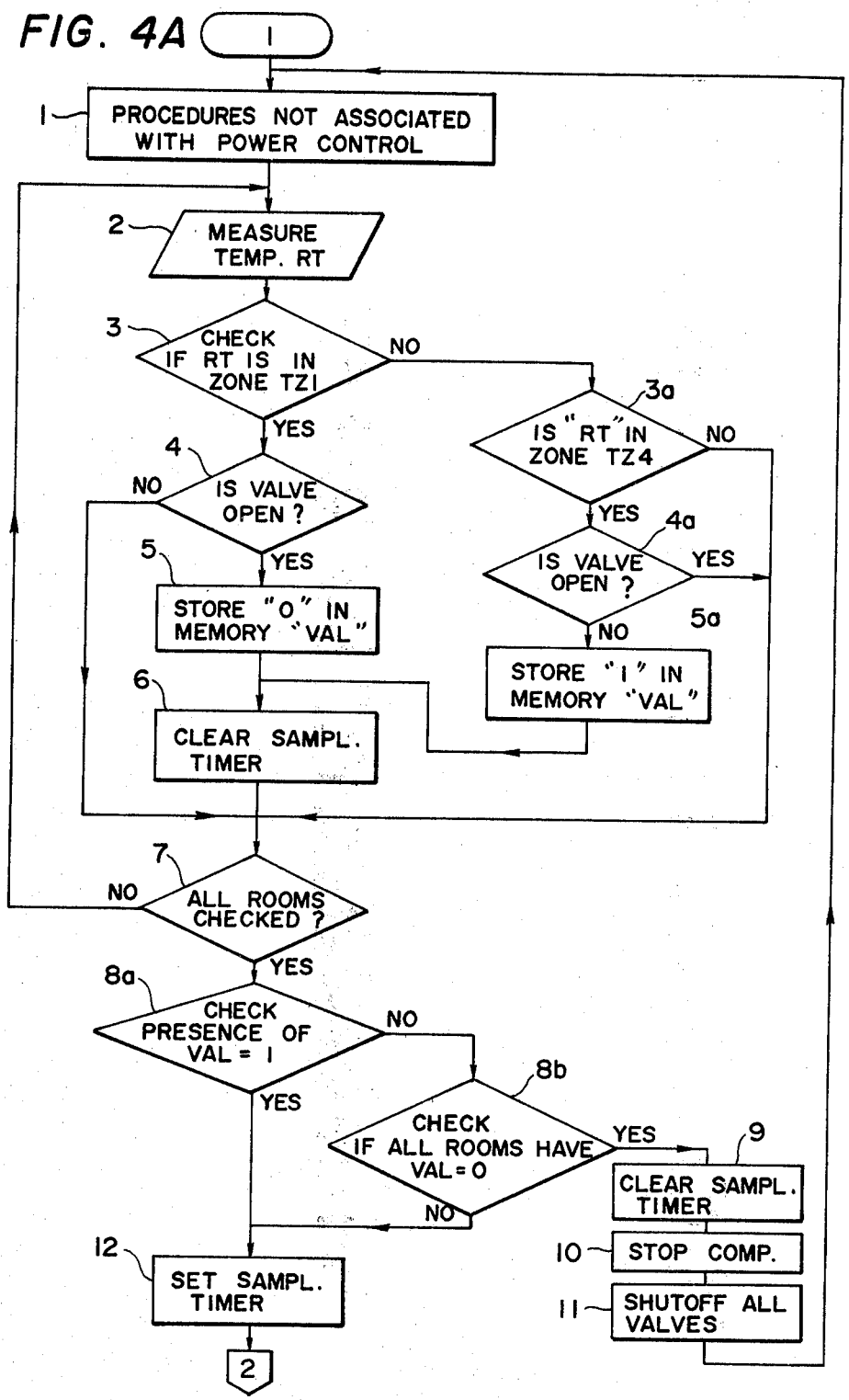

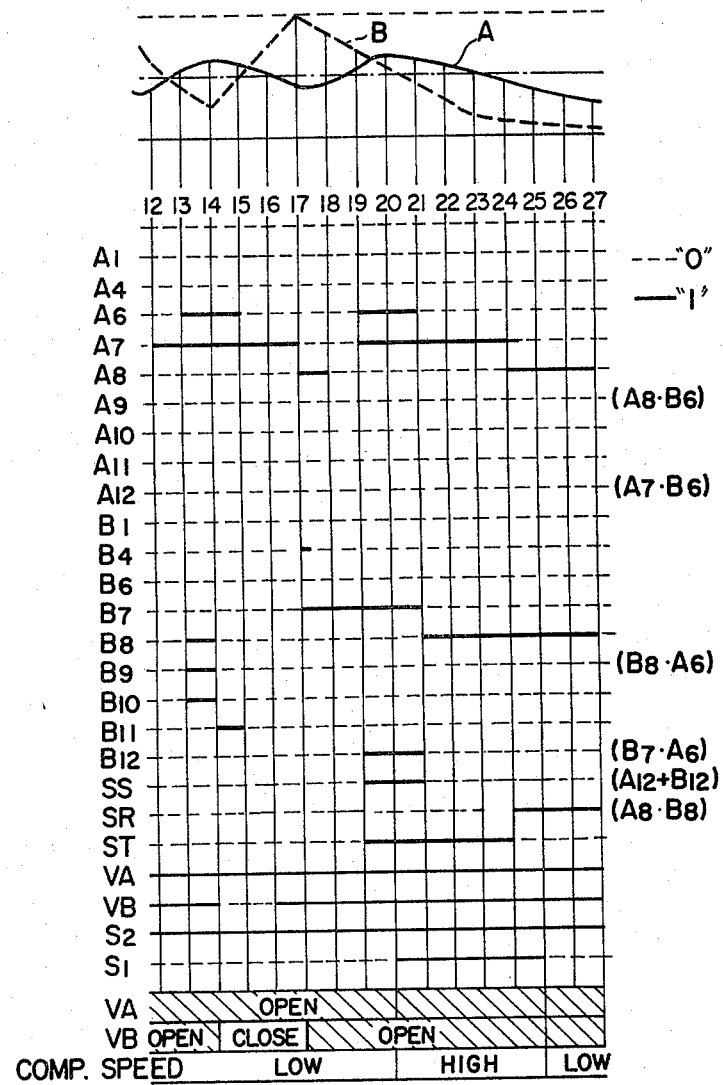

AIR CONDITIONING SYSTEM HAVING A PLURALITY OF INDOOR UNITS

BACKGROUND OF THE INVENTION

The present invention relates to air conditioning systems and particularly to an air conditioning system in which a plurality of rooms is air conditioned by an energy flow supplied from a single energy source through respective flow delivery conduits. More particularly, the invention relates to a control system for controlling the cooling or heating power level of each air-conditioned room in response to the temperature of each room with respect to a control point and to its temperature gradient in relation to the temperature and its gradient of another room.

In a conventional heat pump system having a plurality of indoor units supplied with working fluid from a single outdoor unit, a variable speed compressor is employed as a variable capacity energy source and the control algorithm is such that when the temperature of a given room is higher than a reference temperature the compressor is driven at a high speed to increase the total supply energy level and when the temperature decreases to a level below the reference the compressor speed is switched to a low value to decrease the total amount of supply energy. Therefore, the conventional control algorithm is only based upon the room temperature information relative to its reference level for the purpose of varying the total energy level. Actually, however, each of the air-conditioned rooms has different size, so that its cooling or heating power level which is adequate for a large room is unnecessarily greater than is required for small rooms, causing a waste of energy.

SUMMARY OF THE INVENTION

Accordingly, an object of the present invention is to eliminate the problem experienced in the conventional air conditioning system by diverting a certain amount of supply energy from a room whose air conditioning energy level is greater than is needed to another room whose air conditioning energy level is smaller than is needed in accordance with a detected temperature and its gradient of one room with respect to a detected temperature and its gradient of another room.

According to a further feature of the invention, the detected temperature and its gradient of each room is so interrelated with the corresponding temperature and gradient data of another room to increase the total supply energy when the air conditioning levels of all rooms are detected as falling short of the respectively required levels. A further feature of the invention resides in the fact that when the air conditioning power levels of all rooms are detected as being greater than is required for each room, the total supply energy is reduced to conserve energy.

In an embodiment of the invention in which the air conditioning system is operating as an air cooling system, a temperature zone detector is provided for each room to detect whether the sensed temperature is above or below a predetermined level. Also provided for each room is a temperature gradient detector to detect whether the sensed temperature is on the increase or on the decrease. A valve control signal is generated when a first one of the sensed temperatures is detected as not decreasing in a range above the predetermined temperature and a second one of the sensed temperatures is detected as decreasing in a range below the predetermined temperature. This signal indicates that the cooling power level of the room in which said second temperature is detected is greater than is required for that room and is used to decrease its cooling power to divert a certain amount of the supply energy to another room in which said first temperature is detected. A first energy level control signal is generated when a first one of the sensed temperature is detected as not decreasing in a range above the predetermined temperature while a second one of the sensed temperatures is detected as either increasing or decreasing in a range above the predetermined temperature or detected as increasing in a range below the predetermined temperature. This first energy level control signal indicates that the cooling power levels of all the rooms are smaller than is required for each room and is used to increase the total power of the energy source. A second energy level control signal is generated when all the sensed temperatures are detected as decreasing in a range below the predetermined temperature to decrease the total supply power.

In another embodiment of the invention in which the system is operating as a heating system, the valve control signal is generated when a first one of the sensed temperature is detected as not increasing in a range below said predetermined temperature while a second one of the sensed temperatures is detected as increasing in a range above the predetermined temperature to decrease the supply of energy to the room in which the second temperature is detected in order to increase the energy supply to another room in which said first temperature is detected. The first energy level control signal is generated when a first one of the sensed temperatures is detected as not increasing in a range below the predetermined temperature while a second one of the sensed temperatures is detected as either increasing or decreasing in a range below the predetermined temperature or detected as not increasing in a range above the predetermined temperature for increasing the total power level of the energy supply source. The second energy level control signal is generated when all of the sensed temperatures are detected as increasing in a range above predetermined temperature for decreasing the total power level.

BRIEF DESCRIPTION OF THE DRAWINGS

The invention will be further described with reference to the accompanying drawings, in which:

FIG. 3 is a graphic illustration of temperature variations of two air conditioned rooms in relation to the valve operating conditions and the compressor speed conditions;

FIGS. 4A to 4C are an illustration of a flowchart of the microcomputer of FIG. 2 adapted for use when the system is operating as a cooling system;

FIG. 7 is an illustration of various signal appearing in the embodiment of FIG. 5 with solid lines indicating a logical "1" state and broken lines indicating a logical "0" state in relation to a portion of the curves of FIG. 3;

DETAILED DESCRIPTION

Figure 1:
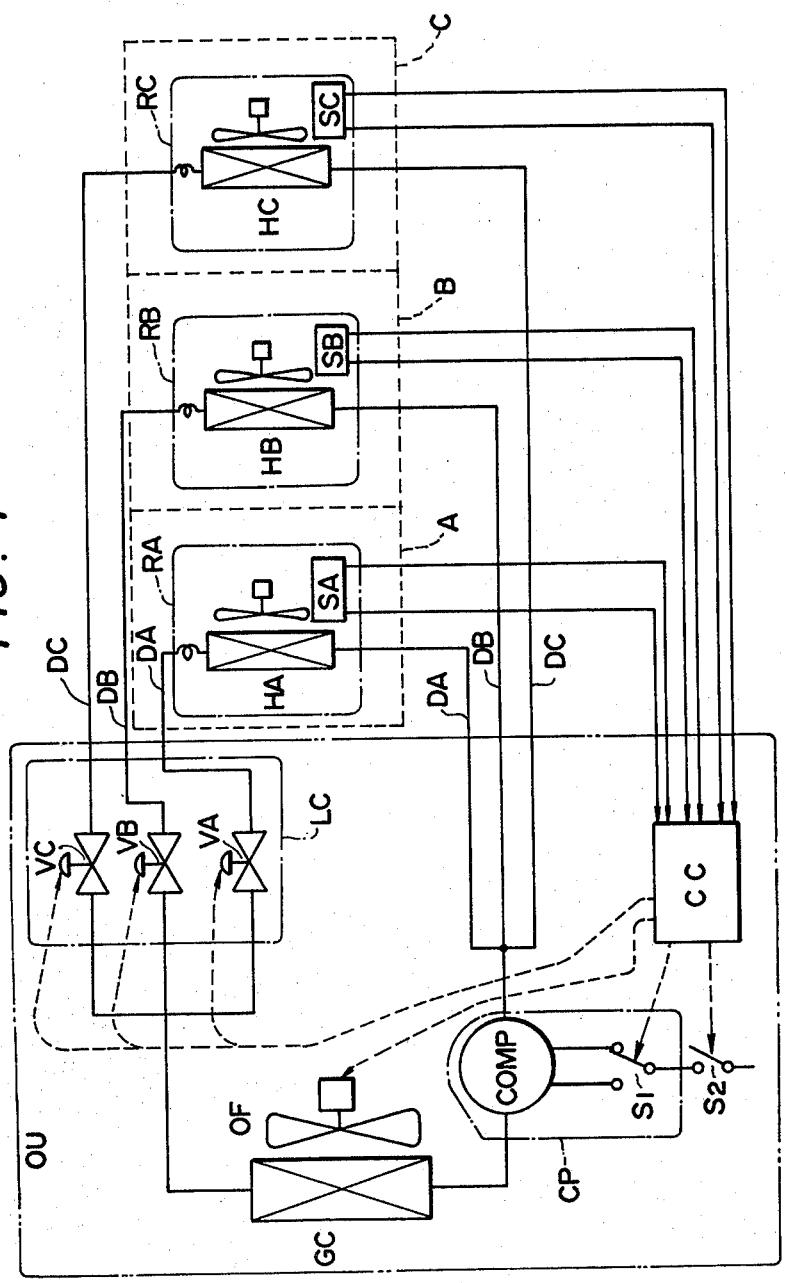
FIG. 1 is a schematic block diagram of an air conditioning system having a plurality of indoor units supplied with working fluid from a single outdoor unit and in which the control system of the invention is employed.

Referring now to FIG. 1, there is schematically shown an air cooling system for purposes of disclosure in which the present invention is adapted. It is to be noted however that the present invention could equally be as well used in a system which provides heating mode, heating-cooling mode, cooling-drying mode or heating-cooling-drying mode, and also in applications in which water is heated in a boiler to serve as a thermal working fluid by means of a variable capacity heat source such as gas burner or in applications where air is heated to serve as the working fluid.

In FIG. 1, OU is an outdoor unit, CP, the variable capacity energy source which is, for example, a two-speed motor driven compressor having a speed change switch S1 and a start-up switch S2. The compressor may, of course, be of the type wherein the speed is continuously variable. GC is a heat exchanger and OF, a fan motor. A working fluid controlling means LC is provided which controls the amount of refrigerant supplied from the energy source CP through a plurality of delivery conduits DA, DB and DC respectively to indoor units RA, RB and RC by means of two-way electromagnetic valves VA, VB and VC which are provided respectively in the conduits DA, DB and DC. Modulating valves may also be used instead of the two-way valves.

The indoor units RA, RB and RC are located in respective rooms A, B, C and each provided with heat exchangers HA, HB and HC, respectively, and also provided with temperature and/or humidity condition sensors SA, SB and SC, respectively for detecting the temperature or relative humidity of the rooms to be air conditioned. These condition sensors SA, SB and SC are not necessarily located within the indoor units RA, RB and RC respectively; they may be located anywhere so long as they can sense the room ambient conditions.

CC is a central control unit which provides control signals to the refrigerant control valve unit LC and to the energy source CP in response to input signals received from the condition sensors SA, SB and SC. The central control unit CC is not necessarily located within the outdoor unit OU; it may be located within any one of indoor units or located in any convenient place as a separate unit.

Figure 2:
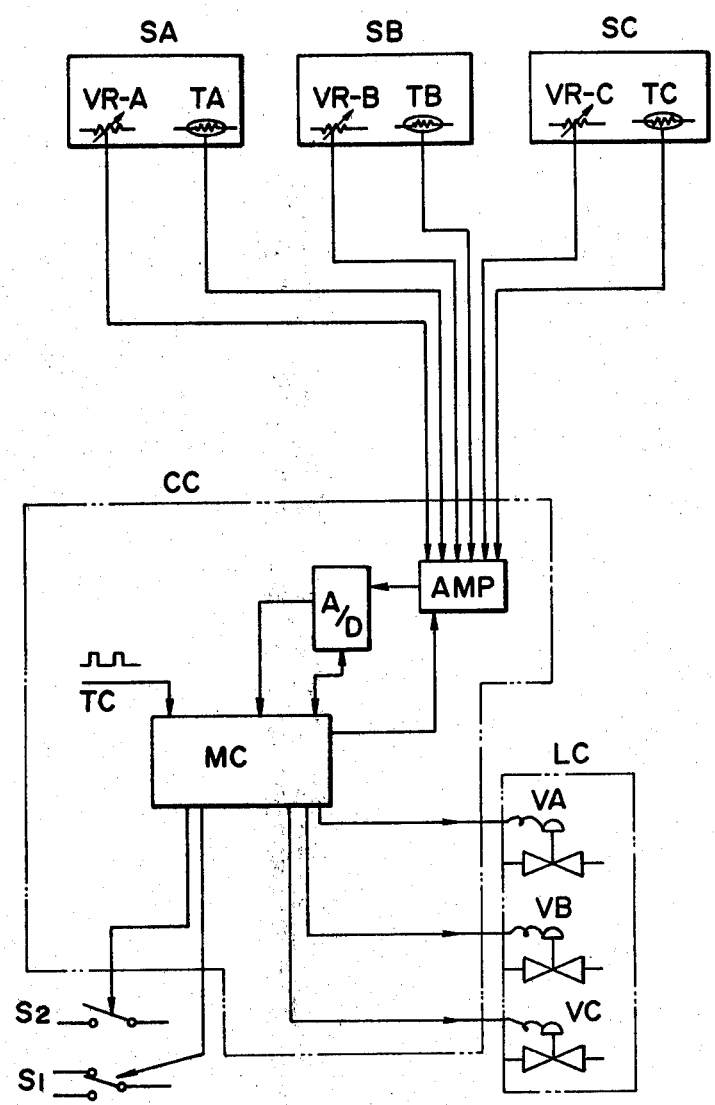
FIG. 2 is a schematic block diagram showing the detail of the temperature sensors and temperature setting devices in relation to the internal structure of the control system of FIG. 1.

FIG. 2 is an illustration of details of the condition sensors SA, SB and SC in relation to the valve control unit LC and the internal structure of the central control unit CC. In FIG. 2, the condition sensors are illustrated as being comprised of temperature sensors such as thermistors TA, TB and TC adapted for detection of the temperature within the space to be cooled and variable resistors VR-A, VR-B and VR-C, respectively, for purposes of setting reference temperatures to which the temperature of the respective spaces is controlled.

The central control unit CC includes an analog multiplexer AMP which receives signals from the condition sensors SA to SC and signals from the temperature setting resistors VRA to VRC and selectively couples the received signals to an analog-digital converter A/D under the control of a microcomputer MC. The digitally converted signal is then applied as an input to the microcomputer MC in response to clock pulses TC and controls the switches S1, S2 and valves VA, VB and VC as will be described hereinbelow. The microcomputer MC is so programmed that it stores the signal received from the analog-digital converter A/D to process the stored signal in accordance with a predetermined control algorithm.

Figure 4B:
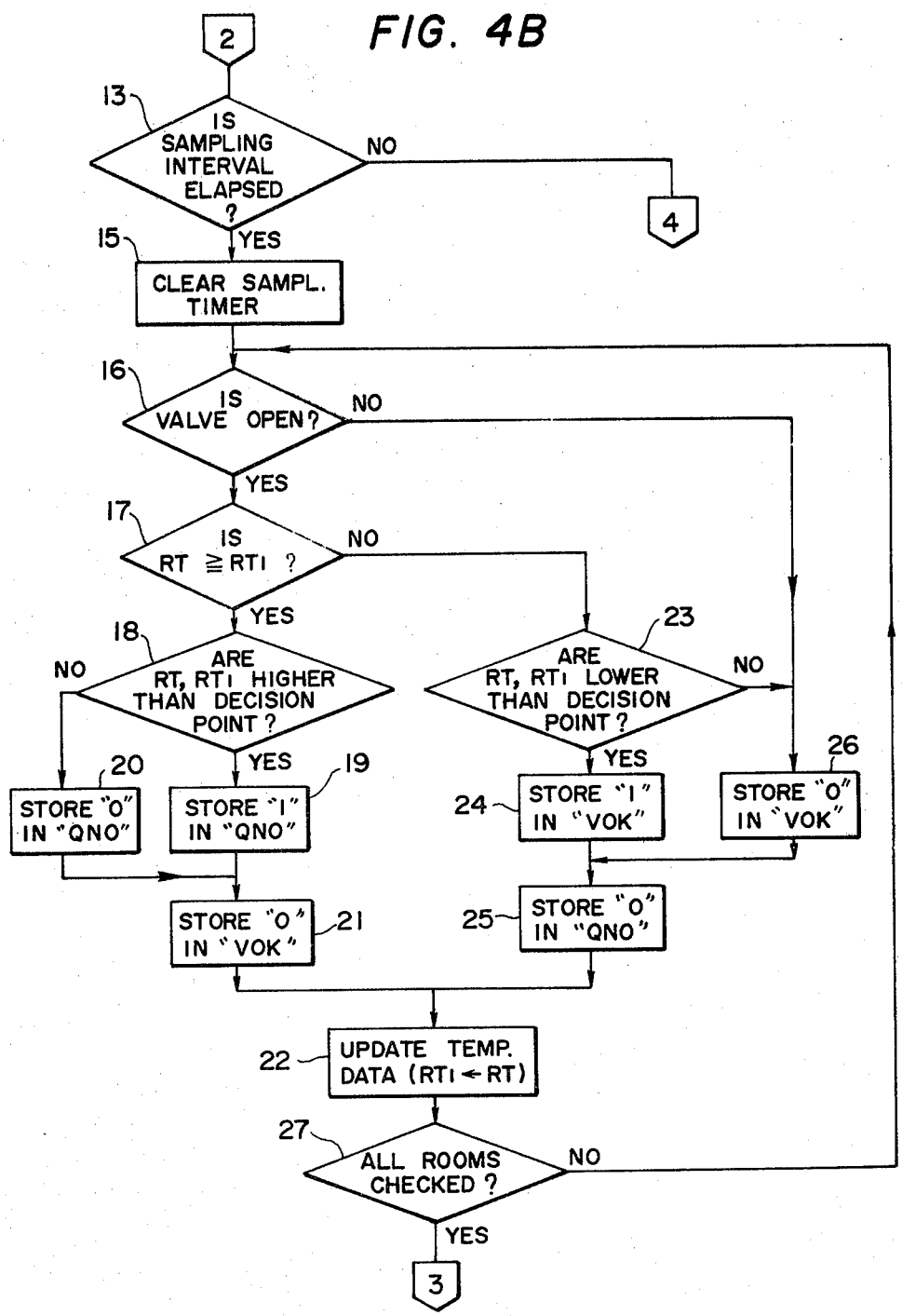
Figure 4C:
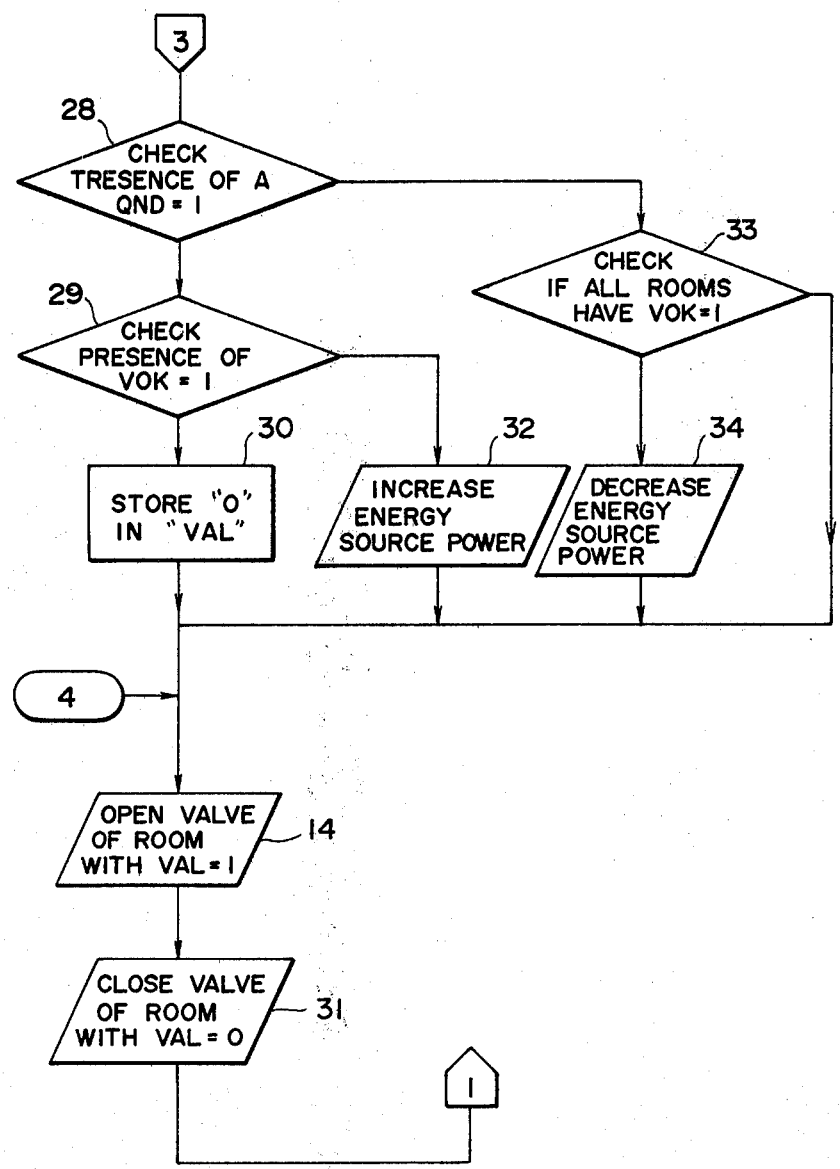

Referring now to FIGS. 4A to 4C which are an illustration of the control algorithm of the microcomputer MC. In step 1 the computer MC is programmed to perform functions not associated with the determination of the cooling power of each air-conditioned room which will be described hereinbelow. After completing the functions specified in step 1, the computer proceeds to step 2 wherein it receives a sampled temperature data from temperature sensors TA, TB and TC in succession and stores the room temperature data RT in respectively associated memory cells of the random access memory (not shown) of the microcomputer and then proceeds to step 3. In the random access memory there is stored data representing a plurality of temperature zones TZ1, TZ2, TZ3 and TZ4 for each room.

As illustrated in FIG. 3, wherein curves A and B show respectively the temperatures of rooms A and B (the temperature of room C is omitted for the sake of simplicity) the first temperature zone TZ1 lies below a reference setting temperature or lower limit point R1 to which the temperature of each room is controlled and at which the control valve of each room is turned off if temperature falls below that point. The second temperature zone TZ2 is defined between the reference point R1 and a decision making point R2 which lies between an upper limit point R3 and the reference point R1, the third zone TZ3 lying between the decision making point R2 and the upper limit point R3 and the fourth zone TZ4 lying above the upper limit point R3. Each of the second and third temperature zones has a temperature band of typically 0.5 degrees centigrade. The temperature defining points R1, R2 and R3 are rendered variable with respect to each air-conditioned room by means of the associated variable resistor VR as mentioned previously.

In step 3, the microcomputer determines whether the room temperature RT of room A lies within the temperature zone TZ1, that is, RT is below the reference point R1 and if RT is below that reference point R1 the computer goes to step 4 to determine whether the datum stored in location VAL of the RAM is "1" and if so the computer proceeds to step 5 to store data "0". This stored datum indicating that valve VA is open is used to close it later. In step 6 a sampling timer is cleared and after this the computer proceeds to step 7. If, in step 4, the datum of VAL is "0" the computer will skip the steps 4, 5 and 6 and go to step 7.

If the room temperature RT is detected as belonging to a temperature zone other than the first zone TZ1 in step 3, the computer proceeds to step 3a to check if RT is within the fourth temperature zone TZ4 and, if so, goes to step 4a to determine if the datum of VAL is "1". If the datum of VAL is "0" a step 5a will be followed to store a data "1" in the storage location VAL and after this the sampling timer is cleared in step 6. If the room temperature RT is within the second or third zone, or the datum of VAL is "1" the computer will proceed to step 7.

In step 7, the computer checks if the above steps are followed with respect to each air-conditioned room and if not the computer returns to step 2 to repeat the above process until all the steps are completed with regard to all the air-conditioned rooms.

In step 8a, the computer checks to see if there is a room having its associated valve in the closed position by investigating the presence of memory cells VAL filled with data "1". If a VAL=1 is present, this signifies that there is a room having its temperature belonging to the fourth zone TZ4 and the computer goes to step 12 to set the sampling timer to count clock pulses and thence to step 13. If the sampling interval is not elapsed, control proceeds to step 14 (FIG. 4C) to open the valve of the room of which the associated memory cell VAL is filled with data "1". As seen from FIG. 3, this valve open operation occurs at a sampling point 7 with respect to the valve VA of room A and at sampling points 4, 11 and 17 with respect to the valve VB of room B at the instant the respective room temperatures enter the fourth zone TZ4.

If the computer fails to detect the presence of a memory VAL=1, this indicates that the temperatures of all the rooms are in the first zone TZ1. If this occurs a shutdown operation of the system is justified and the computer proceeds to step 9 to clear the sampling timer and thence to step 10 to de-energize the compressor COMP and then to step 11 to shut off all the valves.

After the closing or opening operation of the valves, the computer returns to step 1 to repeat the above process.

At the end of a sampling interval, which is typically two and a half minutes, in step 13, the computer then goes to step 15 to clear the sampling timer and thence to step 16 to check to see if the datum of VAL of a given room is "1". If this datum is "1", the computer proceeds to step 17 to check to see if the temperature RT of the given room is higher than the temperature RT1 of that room measured in the previous sampling interval. If RT is not lower than RT1, the temperature variation is not decreasing, i.e. its gradient is positive or zero, ie, non-negative and the computer proceeds to step 18 where it determines whether both temperatures RT and RT1 are higher than the decision making point RT referred to above. That is, if both temperatures are within the third or fourth temperature zones, the computer recognizes that the temperature of the given room is not decreasing as a function of time and deviating from the decision making point R2, so that the cooling power of that room is insufficient and proceeds to step 19 to store a data "1" in a power status memory cell QNO. If one of the temperatures is within the first or second zone, the computer then recognizes that the temperature of that given room is decreasing as a function of time and proceeds to step 20 to store a data "0" in the power status memory QNO. Since in this logical sequence there is absolutely no possibility that RT is lower than RT1, it is necessary to fill another power status memory cell VOK (this indicates that the cooling power of a given room is sufficient) with a data "0" in step 21 for purposes of the computer logic. In step 22, the temperature data is updated by replacing RT1 with the current value RT.

Returning to step 17, if the current temperature RT is lower than the previous temperature RT1, the computer recognizes that the temperature is on the decrease so that its gradient is negative and proceeds to step 23 to check to see if both temperatures RT and RT1 are lower than the decision making point R2, and if so, the computer recognizes that the temperature of the given room is decreasing as a function of time and deviating from the decision making point R2, so that the cooling power of that room is sufficient to divert its cooling power to the other rooms and proceeds to step 24 to place "1" in the power status memory VOK. Since in this logical sequence there is absolutely no possibility that RT is higher than RT1, it is necessary to fill the memory QNO with a data "0" in step 25. If one of the temperatures is above the decision making point R2 the computer recognizes that the room temperature is decreasing as a function of time, however the cooling power of that room is sufficient level and proceeds to step 26 to place "0" in the power status memory VOK and then to step 25. After step 25, the computer proceeds to step 22 to update the temperature data.

In step 27, the computer checks to see if the above procedures have been completed with respect to all the rooms, and if not, it returns to step 16 to repeat the above steps until these steps are completed in respect of all rooms. The computer then goes to step 28 in which it interrogates the previously described storage locations QNO and VOK by checking to see if there is any one room having its associated memory QNO filled with data "1" in step 19. This indicates that the temperature in that room is in the third or fourth zone and its gradient is non-negative, and the computer proceeds to step 29 to locate another room having a data "1" stored in the associated cell VOK in step 24. This signifies that the latter room has a temperature having a negative gradient and lying with the second temperature zone. This condition corresponds to a situation at sampling points 13 and 14 of FIG. 3 wherein the temperature in a first room A (indicated by a solid line curve A) is on the increase above the decision making point R2 while the temperature in a second room B (indicated by a broken line curve B) is on the decrease below the decision making point R2. The computer then proceeds to step 30 to locate the valve status memory VAL associated with memory VOK=1 and updates the memory VAL with a data "0" which signifies that the valve VB of the room B is to be closed. The valve VB is closed subsequently in step 31 at sampling point 14. Therefore, the cooling power of room B is decreased allowing its temperature to gradually rise, while the cooling power of room A is increased relative to room B so that its temperature starts to decrease as seen from FIG. 3.

In step 29, if the computer fails to locate a memory VOK with a data "1" therein, this implies that the power status memory of another room is QNO=1 or 0, or VOK=0. The computer recognizes that the cooling power of this room is not sufficient to divert a certain amount of its energy to the room previously detected as having QNO=1 (that is, the temperature has a non-negative gradient in the third or fourth zone). These conditions correspond to a situation which occurs at sampling points 19 and 20. The computer now proceeds to step 32 in which it sends a command signal to switch S1 to changeover the operating speed of the compressor COMP from low to high values by changing its operational modes from the four-pole operation to the two-pole operation to thereby increase the total cooling energy.

If, in step 28, the computer fails to locate the memory QNO=1, there is a combination of memory states QNO=0, VOK=0 or 1 and the computer goes to step 33 to check to see whether the contents of all memories VOK are "1", indicating that the cooling power levels of all of the rooms are high enough in relation to their cooling loads. These conditions correspond to a portion of the curves of FIG. 3 at sampling points 24 and 25. If such conditions are detected, the computer proceeds to step 34 to switch the compressor speed from high to low values, thereby decreasing the total power of the variable energy source CP.

After step 32 or 34, the computer goes to step 14 to deliver a command signal to open the valves whose associated memories VAL contain datum "1". After step 14, the computer goes to step 31 to shut off valves whose associated memories VAL contain datum "0".

In summary, when the temperature of a given room is detected as entering the fourth temperature zone, the computer generates a control signal to open the associated valve to increase the cooling power of the associated indoor unit, and when the temperature of the given room is detected as entering the first temperature zone, the computer generates another control signal to close the associated valve to thereby decrease the cooling power of the associated indoor unit. If all the temperatures are detected as belonging to the first zone, the computer directs a command to shut off the energy source CP. On the other hand, when the temperature of room A is detected as non-decreasing as a function of time in a range above the decision making point R2 and the temperature of room B is detected as decreasing in a range below the decision making point R2, the computer recognizes that the cooling power level of the room B is relatively large and generates a valve control signal to the valve VB to shut it off to allow a portion of the total cooling energy to be diverted to the indoor unit RA. When the temperature of the room A is detected as non-decreasing in a range above the point R2 and the temperature of room B is detected as either increasing or decreasing in a range above the point R2 or detected as non-decreasing in a range below the point R2, the computer recognizes that the cooling power of the indoor unit RB is not sufficient to divert its energy to indoor unit RA and generates a first energy control signal to increase the total amount of energy by switching the compressor speed from low to high speed.

When the temperatures of all the rooms are detected as decreasing in a range below the point R2, the computer recognizes that the cooling power of all the indoor units is large as compared with their cooling loads and generates a second energy control signal to decrease the total cooling power by switching the compressor speed from high to low values.

Since the compressor has a higher value of energy efficiency ratio (EER) during the low speed operation (four-pole operation) than it has during the high speed operation (two-pole operation) and since the control algorithm of the invention permits the compressor to operate for less intervals in the high speed operation than the interval in which it operates at low speed, it is possible to conserve a substantial amount of energy.

Figure 10:
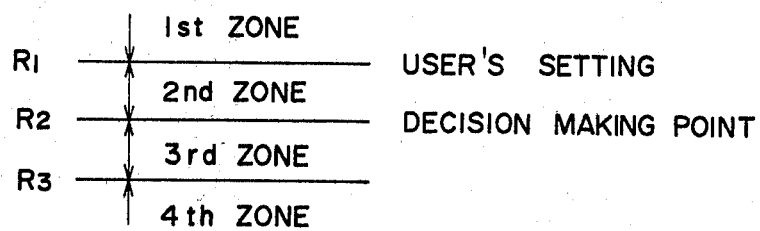
FIG. 10 is an illustration of the temperature zones adapted for use when the system is operating as a heating system.
Figure 11:
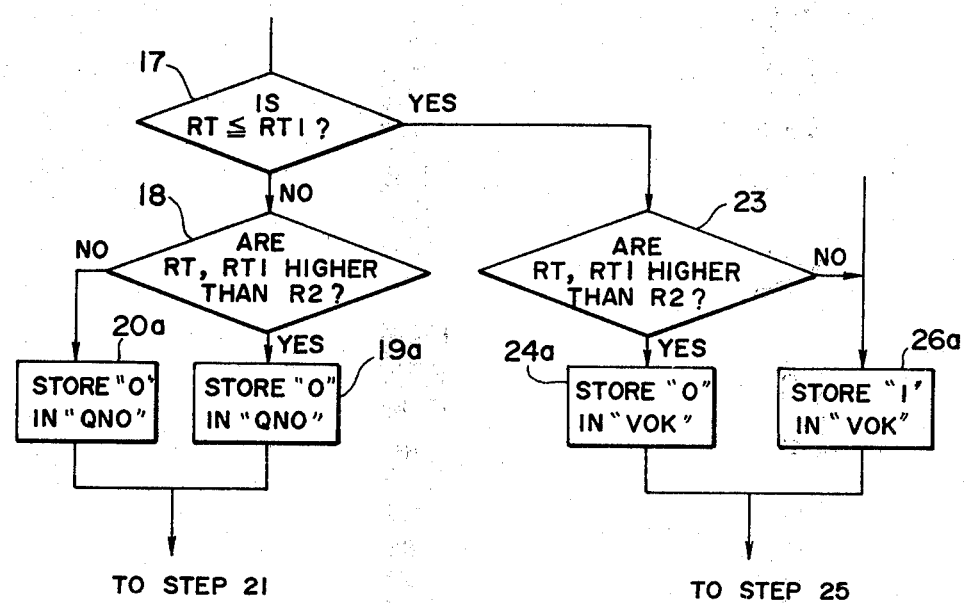
FIG. 11 is a modification of the flowchart of FIG. 4B adapted for use when the system is operating as a heating system.

The control algorithm of the invention may be modified in an obvious manner to apply the concept of the invention to a heating system. In this case, the temperature zones are defined as indicated in FIG. 10 so that the first zone is defined as a range above the first reference temperature (user's setting point) in which the control valve is turned off, the second zone is defined between the first and second reference levels R1 and R2, the latter corresponding to the decision making point, the third zone is defined between the second and third reference temperatures R2 and R3, and the fourth zone is defined as a range below the third reference point R3 in which the control valve is turned on. Since the temperature zone and gradient used in the heating system are opposite respectively to the temperature zone and gradient of the cooling system, the flow chart is modified as shown in FIG. 11. The computer goes to step 18 when it decides that temperature RT is not higher than the previous temperature RT1 and goes to step 23 when the situation is opposite thereto. In step 18a the direction of control flow to the next step is such that the computer proceeds to step 19a when both RT and RT1 are lower than R2 to store data "1" in QNO or goes to step 20a to store "0" in QNO if either RT or RT1 is lower than R2. Similarly, in step 24a, a datum "0" is stored in VOK and in step 26a, a data "1" is stored therein.

Therefore, in the heating system, the valve control signal is generated when the temperature of room A is detected as not increasing in a range below the decision making point R2 and the temperature of room B is detected as increasing in a range above the point R2 for purposes of closing the valve VB. The first energy control signal is generated when the temperature of room A is detected as not increasing in a range below the point R2 and the temperature of room B is detected as either increasing or decreasing in a range below the point R2 or detected as decreasing in a range above the point R2 for purposes of increasing the total heating energy supplied from source CP. Similarly, the second energy control signal is generated when the temperatures of all rooms are detected as increasing in a range above the point R2 to decrease the total heating energy to a low value.

Figure 5:
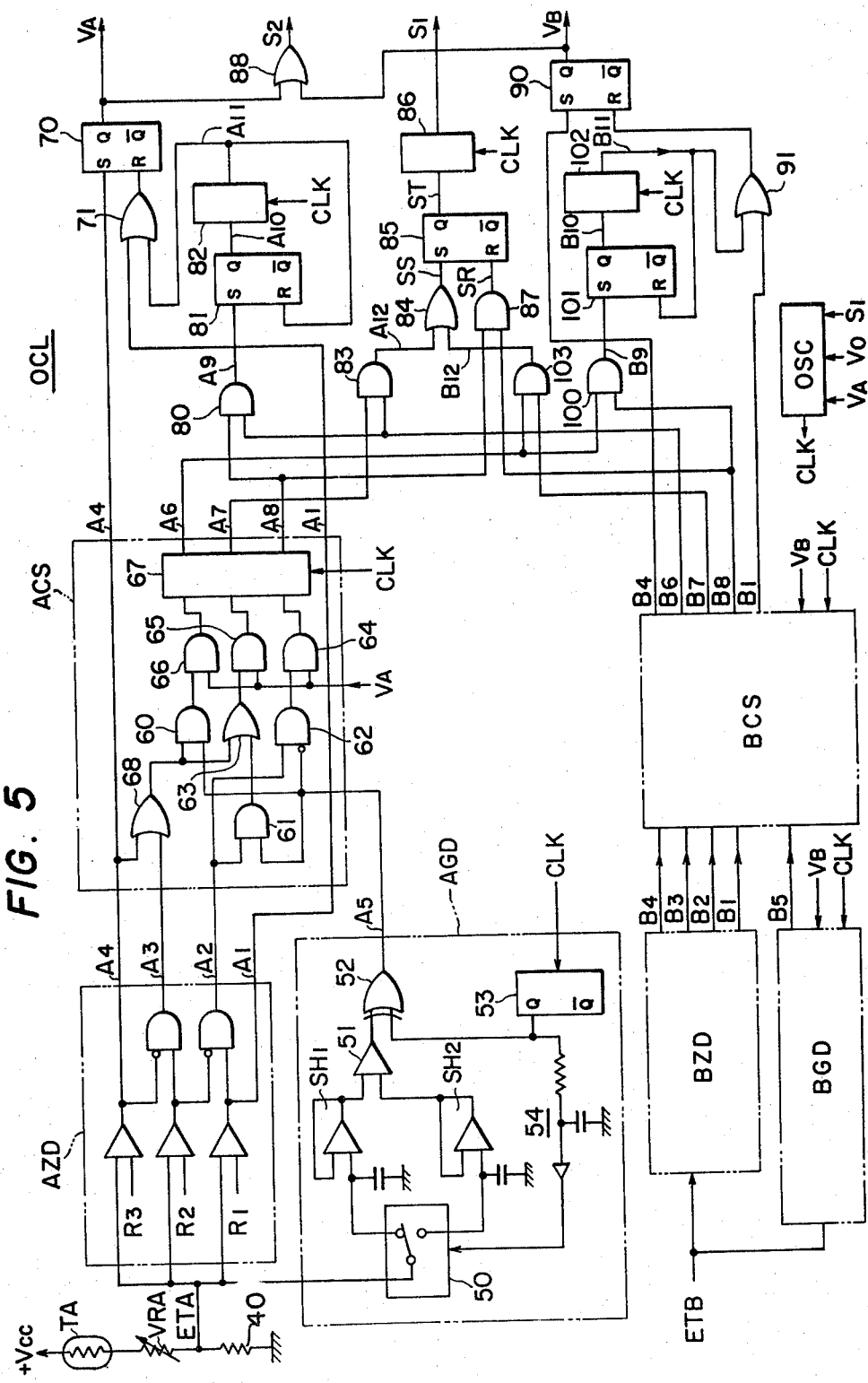
FIG. 5 is a block diagram of the central control unit of FIG. 2 which is an alternative embodiment of the microcomputer programmed in accordance with the flow chart of FIGS. 4A to 4C.

The central control CC of the invention for a cooling system can also be realized by logical circuit elements as shown in FIG. 5. In this embodiment only the power level of two indoor units RA and RB is controlled for the sake of simplicity. It is obvious to add an addtional logic circuit to effect simultaneous power control for all rooms A, B and C. The circuit of FIG. 5 generally comprises a temperature zone detector AZD for room A, a control signal generator ACS for room A, and a temperature gradient detector AGD for room A. Similarly, for room B the circuit includes a temperature zone detector BZD, a control signal generator BCS and a temperature gradient detector BGD. Additionally, an output control logic circuit OCL is included to produce a set of command signals for valves VA, VB and switches S1 and S2.

In the circuit of FIG. 5, the temperature sensor TA and the variable resistor VRA for room A is connected in series between terminals of a voltage source to generate a manually proportioned voltage signal ETA at a junction point between resistors VRA and 40. Similarly, temperature sensor TB and variable resistor VRB for room B are connected in series to derive a proportioned voltage signal ETB. The voltage ETA is applied to the temperature zone detector AZD which includes comparators 41, 42 and 43 having their noninverting inputs connected together to receive the voltage ETA and their inverting inputs connected to receive reference voltages corresponding to the reference temperature levels R1, R2 and R3, respectively. The zone detector further includes an AND gate 44 which receives at one input thereof an output signal from the comparator 41 and at an inverted input terminal thereof an output from the comparator 42, and an AND gate 45 which receives at one input thereof an output from the comparator 42 and at an inverted input thereof an output from the comparator 43.

The comparators 41 to 43 generate logical "1" outputs when the voltage ETA exceeds the respective reference voltages R1, R2 and R3, and generate logical "0" outputs when ETA falls below R1, R2, R3, respectively. The logical "0" output from the comparator 41 is inverted by an inverter 46 to generate a signal A1 indicating that the sensed temperature of room A is in the first temperature zone TZ1. Similarly, the logical "1" outputs from the AND gates 44, 45 and comparator 43 are signals A2, A3 and A4 which respectively represent that the temperature of room A is within the second, third and fourth zones.

The fourth zone signal A4 is connected to the set input of a flip-flop 70 which receives at its reset input the first zone signal A1 through an OR gate 71. Therefore, whenever the temperature enters the first zone, the flip-flop 70 is reset so that its true output Q goes low to close the valve VA and if the temperature enters the fourth zone, the flip-flop 70 is switched to a set condition to cause its Q output to go high to thereby open the valve VA.

Figure 6:
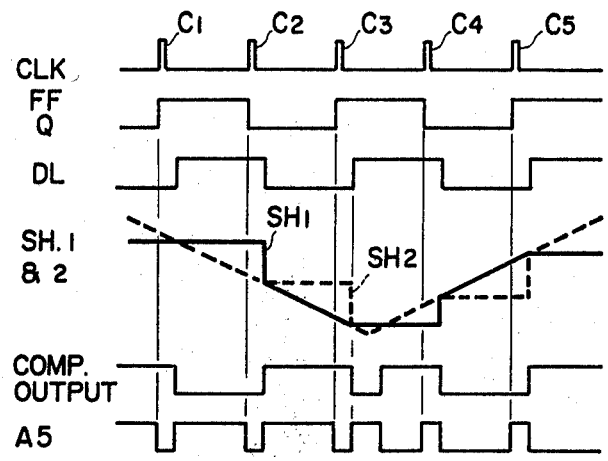
FIG. 6 is an illustration of signal waveforms appearing in the gradient detectors of FIG. 5.

The gradient detector AGD includes a pair of samplehold circuits SH1 and SH2 which alternately receive the temperature signal ETA through a switching gate 50, and a comparator 51 having an inverting input thereof connected to the output of sample-hold SH1 and a noninverting input thereof connected to the output of sample-hold SH2. The output of the comparator 51 is applied as one input to an Exclusive OR gate 52 which receives another input from the Q output of a flip-flop 53. This flip-flop receives a sampling pulse from a clock source OSC to generate high and low level outputs alternately in response to each clock pulse. To the output of flip-flop 53 is connected a delay network 54 for generating delayed switching control pulses to be applied to the switching gate 50. Because of the alternate application of the input signal to the sample-hold circuits, the output signal of the sample-hold SH1 adopts a solid-line curve in FIG. 6 and the output of the sample-hold SH2 adopts a broken-line curve. Therefore, a logical "0" outputs are delivered from the Exclusive OR gate 52 in response to clock pulses C1, C2 and C3 during the time when the temperature is on the decrease, and logical "1" outputs are generated in response to clock pulses C4 and C5 during the time when the temperature is on the increase. Since the control signals are stored and delivered in response to the sampling clock pulse as will be described hereinbelow, the output of the Exclusive OR gate 52 which is generated in response to the clock pulse, is effectively utilized in the control signal generator ACS.

The control signal generator ACS receives the signal A5 from the gradient detector AGD to enable AND gates 60, 61 and 62. The AND gate 60 generates a logical "1" output upon the coincidence of a signal A4 or A3 with a signal A5, the AND gate 61 providing a logical "1" output upon coincidence between signals A2 and A5 and the AND gate 62 providing a logical "1" output upon coincidence between signal A2 and inverted or logical "0" level of signal A5. The output of the AND gate 61 is coupled to an OR gate 63 which also receives the signal A3 or A4 through an OR gate 68. The outputs of the AND gates 60 and 62 and OR gate 63 are connected through AND gates 54, 65 and 66 respectively to a latching circuit 67. The AND gates 64 to 66 are enabled in response to an output signal from the Q output of flip-flop 70 which is applied as a valve control signal to the valve VA so that the inputs to the latching circuit 67 appear during the time when the valve VA is in the open position. The latch 67 accepts the input signals in response to the sampling clock pulse and generates a set of signals A6, A7 and A8 corresponding respectively to logical "1"s from the gates 66, 65 and 64.

Since the coincidence between signals A3 or A4 and A5 occurs when the temperature is in the third or fourth zone and its gradient is positive, signal A6 is generated during the interval between sampling points 13 and 15 and the interval between sampling points 19 and 21 as seen from FIG. 7. Being a summation of signal A3 or A4 and a logical "1" outpt from AND gate 61 which occurs during the time when the temperature is in the second zone and its gradient is positive, the signal A7 occurs during the interval between sampling points 12 and 17 and during the interval between sampling points 19 and 24. The signal A8 on the other hand occurs during sampling points 17 and 18 and sampling points 24 and 27 when the temperature is within the second zone and its gradient is negative.

The circuits BZD, BGD and BCS of the room B are of the identical construction to the corresponding circuits of the room A and therefore the signals B1 to B8 correspond respectively to signals A1 to A8. The signal B4 is applied to the set input of a flip-flop 90 which is arranged to be reset in response to signal B1 applied through an OR gate 91, a logical "1" at the Q output of the flip-flop 90 being used to operate the valve VB so that the latter opens in response to signal B4 and closes in response to signal B1.

A signal A9 is provided by an AND gate 80 when it detects a coincidence between signals A8 and B6. Similarly, a signal B9 is provided by an AND gate 100 when the latter detects a coincidence between signals B8 and A6. Therefore, signal B9 occurs during the interval between sampling points 13 and 14 (FIG. 7). The signal A9 is applied to the set input of a flip-flop 81 to generate a signal A10 and which flip-flop is reset in response to a signal A11 supplied from a continuity detector 82. Similarly, the signal B9 is applied to the set input of a flip-flop 101 to generate a signal B10 and which flip-flop is reset in response to a signal B11 supplied from another continuity detector 102. As will be described hereinbelow, each of the continuity detectors serves to detect when signal A9 or B9 prevails during the interval between successive sampling points.

Figure 8:
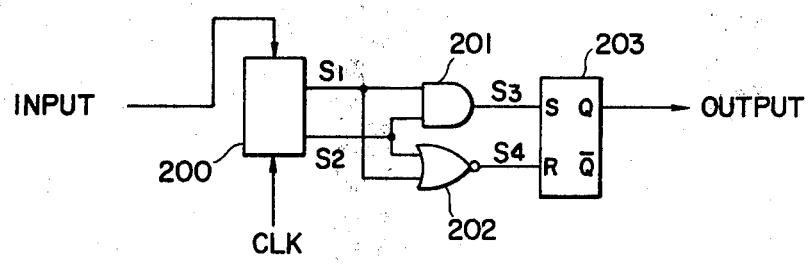
FIG. 8 is the detail of the continuity detectors of FIG. 5.
Figure 9:
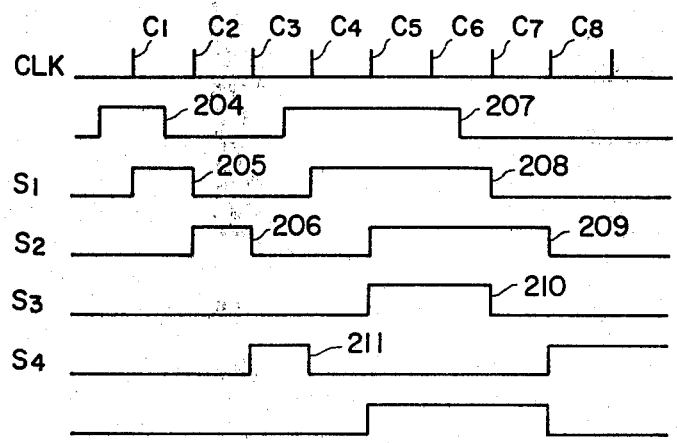
FIG. 9 is an illustration of signal waveforms associated with the circuit of FIG. 8.

In FIG. 8, each of the continuity detectors 82 and 102 is shown as comprising a shift register 200 having a data input terminal connected to receive signal A10 or B10 and a clock input terminal for receiving the sampling clock pulse and having a first bit position connected to an input of an AND gate 201 and a NOR gate 202 and a second bit position connected to another input of the gates 201 and 202. The output terminals of the gates 201 and 202 are connected respectively to the set and reset inputs of a flip-flo 203. As will be seen from FIG. 9, a signal S1 from the first bit position output of the shift register 200 goes into a logical "1" state in response to a clock pulse C1 in the presence of a logical "1" input signal 204 and goes into a logical "0" state in response to a clock pulse C2 in the presence of a logical "1" input signal, thus generating a pulse 205. The logical "1" state in the first bit position is shifted to the second bit position in response to the clock pulse C2, so that a signal S2 from the second bit position is at a logical "1" level during the interval between clock pulses C2 and C3, thus generating a pulse 206. Since pulses 205 and 206 do not coincide, the output signals S3 of AND gate 201 is at a logical "0" level. If an input pulse 207 is applied which remains in the logical "1" state for an interval longer than the interval between sampling pulses C4 and C6, the signal S1 is a pulse 208 which is present during the interval between sampling pulses C4 and C7 and this pulse is shifted by one sampling interval so that the signal S2 is at a logical "1" level during the interval between sampling pulses C5 and C8 (pulse 209). Thus, the signal S3 from the AND gate 201 is a logical "1" during interval between sampling pulses C5 and C7 (pulse 210). The latter pulse triggers the flip-flop 203 into a set condition to cause its Q output to go high in response to the clock pulse C5 to indicate that there is present a logical "1" input for an interval in excess of successive sampling pulses. The presence of a logical "0" input for more than a sampling interval is also detected by the NOR gate 202. The NOR gate produces a signal S4 having a logical "1" level for an interval between pulses C3 and C4 (pulse 211). Since this pulse occurs during the reset condition of the flip-flop 203, the output state of the latter remains unchanged to indicate the continuance of the input signal being at logical "0" level. The signal S4 is again at logical "1" level in response to clock pulse C8 to reset the flip-flop 203, thereby detecting the presence of the input being a logical "0" during at least one sampling interval between clock pulses C7 and C8.

Therefore, signals A11 and B11 occur if respective input signals A10 and B10 are present for an interval longer at least one sampling interval to reset the flip-flops 70 and 90 through OR gates 71 and 91, respectively. As seen from FIG. 7, temperature curve B drops below the decision making point R2 causing a signal B2 to occur at a sampling point 13 and since its gradient is negative a signal B8 is also generated. On the other hand, the temperature curve A is above the point R2 at the sampling point 13 and its gradient is positive, a signal A6 is generated. Thus, the AND gate 100 is activated to generate a signal B9 and because of its presence at the next sampling point 14, a signal B11 is produced for the next sampling interval between points 14 and 15. In response to the leading edge of the signal B11, the flip-flop 90 is reset to cause its Q output to go low to close the valve VB. The valve VB remains closed until a signal B4 is generated when the temperature B reaches the upper limit point or turn-on point R3 at sampling point 17.

A signal B7 is present during sampling interval between points 17 and 21 because of the negative gradient temperature in the third zone and a signal A6 is present during an interval between sampling points 19 and 21 because of the temperature A being in the third zone with a positive gradient. This satisfies the input condition of an AND gate 103 to generate a logical "1" output which is applied through an OR gate 84 as a setting input signal SS to the set input of a flip-flop 85 to generate a signal ST which triggers a continuity detector 86 of the same construction as the continuity detectors 82 and 102 to generate therefrom an output signal S1 having a logical "1" level at sampling point 20 for switching the compressor speed from low to high values to increase the total amount of energy supplied to the indoor units RA and RB.

The flip-flop 85 is reset in response to a signal SR provided by an AND gate 87 when the latter detects a coincidence between signals A8 and B8 at sampling point 24 when both temperatures enter the second temperature zone TZ2. Therefore, the signal S1 is logical "1" at sampling point 25 to switch the compressor speed to low value thus causing the total power supply level to decrease to a low value.

When one of the flip-flops 70 and 90 is in a set condition, an OR gate 88 is activated to close the switch S2, and if both flip-flops 70 and 90 are switched to reset condition the output of the OR gate 88 goes into a logical "0" state to open the switch S2 and the compressor COMP is de-energized.

What is claimed is:

1. An air conditioning system comprising:
   a variable capacity energy source for providing working fluid at variable energy levels in response to a signal applied thereto;
   a plurality of delivery means for delivery of said working fluid to separate spaces for air conditioning the respective spaces;
   working fluid control means provided in said delivery means for controlling the amount of working fluid supplied therethrough in response to a signal applied thereto;
   a plurality of temperature setting devices for setting reference temperatures respectively for said spaces;
   a plurality of temperature detectors for measuring the temperature of the respective spaces; and
   a central control unit including means for setting a plurality of temperature zones in response to said reference temperatures respectively for said spaces, means for detecting to which one of said temperature zones each of said measured temperatures belongs, means for detecting the temperature gradient of each of said measured temperatures, and means for generating a control signal based on said detected temperature gradient and said detected temperature zone and applying said control signal to one or both of said working fluid control means and said energy source.

2. An air conditioning system as claimed in claim 1, wherein said working fluid control means comprises a plurality of fluid control means respectively provided in said plurality of delivery means for controlling the respective fluids passing through said delivery means.

3. An air conditioning system as claimed in claim 2, wherein said control unit includes means for sampling said measured temperatures successively at periodic intervals, means for storing the corresponding value of each of the sampled temperatures and means for comparing the stored temperature value with said sampled temperature value which occurs subsequent to said stored temperature value to determine whether each of said temperature is on the increase or decrease.

4. An air conditioning system as claimed in claim 3, further comprising means for synchronizing said sampling means with the application of said control signal to said fluid control means so that the interval between successive sampling events commences in response to said control signal.

5. An air conditioning system as claimed in claim 2, wherein said system is operable as a cooling system, further comprising means for closing an associated one of said fluid control means when said detected temperature zone is below a preset temperature or opening an associated one of said fluid control means when said detected temperature zone is higher than said preset temperature by a certain temperature value.

6. An air conditioning system as claimed in claim 2, wherein said system is operable as a heating system, further comprising means for closing an associated one of said fluid control means when said detected temperature zone is higher than a preset temperature by a certain temperature value or opening an associated one of said fluid control means when said detected temperature zone is below said preset temperature.

7. An air conditioning system as claimed in claim 2 or 3, wherein said system is operable as a cooling system, wherein said central control unit includes means for defining a first temperature zone which lies in a range below a first preset temperature corresponding to a user's setting value, a second temperature zone which lies in a range between said first preset temperature and a second preset temperature corresponding to a decision making point, a third temperature zone which lies in a range between said second preset temperature and a third preset temperature, and a fourth temperature zone which lies in a range above said third preset temperature, means for detecting to which one of said first, second, third and fourth temperature zones each said measured temperature belongs, means for generating a control signal for de-energizing said energy source when each said measured temperature is detected as belonging to said first zone and for opening an associated one of said fluid control means when each said measured temperature is detected as belonging to said fourth zone.

8. An air conditioning system as claimed in claim 7, wherein said gradient detecting means includes means for detecting whether each of said measured temperatures has a non-negative gradient when each said temperature is not increasing as a function of time or a negative gradient when each said temperature is decreasing as a function of time, and wherein said control signal generating means further comprises:
means for generating a fluid control signal when one of said measured temperatures is detected as having a non-negative temperature gradient and as belonging to said third or fourth temperature zone and another one of said measured temperatures is detected as having a negative temperature gradient and as belonging to said second temperature zone, said fluid control signal being applied to one of said fluid control means for decreasing the amount of working fluid passing therethrough, said one of said fluid control means being associated with the space in which said another one of said measured temperatures is detected.

9. An air conditioning system as claimed in claim 7, wherein said control signal generating means further comprises means for generating an energy level control signal when one of said measured temperatures is detected as having a non-negative temperature gradient and as belonging to said third or fourth temperature zone and another one of said measured temperatures is detected as having either one of said temperature gradients and as belonging to said third or fourth temperature zone or detected as having a non-negative temperature gradient and as belonging to said second temperature zone, said energy level control signal being applied to said energy source to increase its energy level.

10. An air conditioning system as claimed in claim 7, wherein said control signal generating means further comprises means for generating a second energy level control signal when all of said measured temperatures are detected as having a negative temperature gradient and as belonging to said second temperature zone, said second energy level control signal being applied to said energy source to decrease its energy level.

11. An air conditioning system as claimed in claim 2 or 3, wherein said system is operable as a heating system, and wherein said central control unit includes means for defining a first temperature zone which lies in a range above a first preset temperature corresponding to a user's setting value, a second temperature zone which lies in a range between said first preset temperature and a second preset temperature corresponding to a decision making point, a third temperature zone which lies in a range between said second preset temperature and a third preset temperature, and a fourth temperature zone which lies in a range below said third preset temperature, means for detecting to which one of said first, second, third and fourth temperature zones each of said measured temperature values belongs, means for generating a control signal for de-energizing said energy source when said each said measured temperature value is determined as belonging to said first temperature zone and for opening an associated one of said fluid control means when each of said measured temperature values is detected as belonging to said fourth temperature zone.

12. An air conditioning system as claimed in claim 11, wherein said gradient detecting means includes means for detecting whether each of said measured temperatures has a positive gradient when each said temperature is increasing as a function of time or a non-positive gradient when each said temperature is not increasing as a function of time, and wherein said control signal generating means further comprises means for generating a fluid control signal when one of said measured temperatures is detected as having a non-positive temperature gradient and as belonging to said third or fourth temperature zone and another one of said measured temperatures is detected as having a positive temperature gradient and as belonging to said second temperature zone, said fluid control signal being applied to one of said fluid means for decreasing the amount of working fluid passing therethrough, said one of said fluid control means being associated with the space in which said another one of said measured temperatures is detected.

13. An air conditioning system as claimed in claim 11, wherein said control signal generating means further comprises means for generating an energy level control signal when one of said measured temperatures is detected as having a non-positive temperature gradient and as belonging to said third or fourth temperature zone and another one of said measured temperatures is detected as having either one of said temperature gradient and as belonging to said third or fourth zone or detected as having a non-positive temperature gradient and as belonging to said second temperature zone, said energy level control signal being applied to said energy source for increasing its energy level.

14. An air conditioning system as claimed in claim 11, wherein said control signal generating means further comprises means for generating a second energy level control signal when all of said measured temperatures are detected as having a positive temperature gradient and as belonging to said second temperature zone, said second energy level control signal being applied to said energy source for decreasing its energy level.

15. An air conditioning system as claimed in claim 1, wherein said energy source comprises a compressor and a variable speed electric motor for driving said compressor at a variable speed.

16. An air conditioning system as claimed in claim 15, wherein said electric motor is of a type which is continuously variable in speed.

17. An air conditioning system as claimed in claim 1 or 3, wherein said system is operable as a cooling system, and wherein said central control unit comprises means for detecting whether each of said measured temperatures is above or below a predetermined temperature level, means for determining whether each of the measured temperatures is not decreasing or decreasing as a function of time, means for generating a control signal when one of said measured temperatures is detected as increasing in a range above said predetermined temperature level and another one of said measured temperatures is detected as decreasing in a range below said predetermined temperature level and applying said control signal to the valve means associated with the space in which said another one of said measured temperatures is detected.

18. An air conditioning system as claimed in claim 17, wherein said control unit further comprises means for generating an energy level control signal when one of said measured temperatures is detected as not decreasing in a range above said predetermined temperature level and another one of said measured temperatures is detected as either not decreasing or decreasing in a range above said predetermined temperature level or detected as not decreasing in a range below said predetermined temperature level, said energy level control signal being applied to said energy source for increasing its energy level.

19. An air conditioning system as claimed in claim 17, wherein said control unit further comprises means for generating a second energy level control signal when all of said measured temperatures are detected as decreasing in a range below said predetermined temperature level, said second energy level control signal being applied to said energy source for decreasing its energy level.

20. An air conditioning system as claimed in claim 1 or 3, wherein said system is operable as a heating system, and wherein said central control unit comprises means for detecting whether each of said measured temperatures is above or below a predetermined temperature level, means for determining whether each of the measured temperatures is increasing or not increasing as a function of time, means for generating a control signal when one of said measured temperatures is detected as decreasing in a range below said predetermined temperature level and another one of said measured temperatures is detected as increasing in a range above said predetermined temperature level and applying said control signal to the fluid control means associated with the space in which said another one of said measured temperatures is detected.

21. An air conditioning system as claimed in claim 20, wherein said control unit further comprises means for generating an energy level control signal when one of said measured temperatures is detected as decreasing in a range below said predetermined temperature level and another one of said measured temperatures is detected as either increasing or not increasing in a range below said predetermined temperature level or detected as not increasing in a range above said predetermined temperature level, said energy level control signal being applied to said energy source for increasing its energy level.

22. An air conditioning system as claimed in claim 21, wherein said control unit further comprises means for generating a second energy level control signal when all of said measured temperatures are detected as increasing in a range above said predetermined temperature level, said second energy level control signal being applied to said energy source for decreasing its energy level.

23. An air conditioning system as claimed in claim 1, wherein said temperature gradient detecting means comprises:
  a pair of sample-and-hold circuits;
  means for alternately causing said sampled-and-hold circuits at periodic intervals to receive a signal from a respective one of said temperature detectors; and
  a comparator for comparing output signals from said sample-and-hold circuits to generate a bi-level signal.

24. A method for controlling an air conditioning system having a plurality of indoor units supplied with working fluid through respective delivery passages from a variable capacity energy source for air conditioning a plurality of rooms, each of said passages including a control valve for regulating the amount of fluid passing therethrough, comprising the steps of:
  (1) measuring the temperature of each of said rooms;
  (2) generating a data representing each of the measured temperatures;
  (3) storing each said temperature data in a memory;
  (4) comparing the most recent temperature data of each room with the temperature data previously stored in each said memory;
  (5) if said most recent data is greater in value than said compared stored data, checking to see if both of said data are greater in value than a predetermined data representing a predetermined temperature;
  (6) storing a data "1" or "0" if both of said data are greater than said predetermined data or not, respectively;
  (7) if said most recent data is not greater than said stored data, checking to see if both of said data are smaller in value than said predetermined data;
  (8) storing a data "1" or "0" if both of said data are smaller than said predetermined data or not, respectively;
  (9) updating each said previously stored temperature data with each said most recent temperature data;
  (10) repeating steps (1) to (9) until said steps (1) to (9) are processed with respect to the temperatures of all of said rooms;
  (11) checking to see if there is present a said data "1" stored in step (6);

(12) if said data "1" is present in step (11), checking to see if there is present a said data "1" stored in step (8); and

(13) generating a valve control signal if said data "1" is present in step (12) for closing the one of said valves which is associated with the last-mentioned data "1".

25. A method as claimed in claim 24, further comprising:

(14) generating an energy level control signal if said data "1" is not present in step (12) for controlling said energy source to increase its capacity.

26. A method as claimed in claim 25, further comprising the steps of:

(15) if said data "1" is not present in step (11), checking to see if the number of said data "1" stored in step (8) is equal to the number of said rooms; and

(16) generating a second energy level control signal if said numbers are equal to each other for controlling said energy source to decrease its capacity.

27. A method as claimed in claim 24, 25 or 26, further comprising the steps of:

(17) storing a data representing a lower limit temperature below said predetermined temperature and a data representing an upper limit temperature above said predetermined temperature with respect to each said room;

(18) comparing each said most recent temperature data generated in step (2) with said lower limit temperature data;

(19) if each said most recent temperature data is smaller than said lower limit temperature data, checking to see if one of said valves is in the open or closed condition;

(20) storing a data "0" if said one of said valves in in the open condition in step (19);

(21) if each said most recent temperature data is greater than said lower limit temperature data, comparing each said most recent temperature data with said upper limit temperature data;

(22) if each said most recent temperature data is greater than said upper limit temperature data, checking to see if said one of said valves is in the open or closed condition;

(23) storing a data "1" if said one of said valves is in the closed condition in step (22);

(24) if said one of said valves is in the closed condition in step (19) or (22), or if each said most recent temperature data is not greater than said upper limit data compared in step (21), or in response to step (20) or (23), repeating steps (1), (2), (17) to (23) until the last mentioned steps are processed with respect to the temperatures of all of said rooms;

(25) checking to see if there is a said data "1" stored in step (23);

(26) generating a second valve control signal if said data "1" is present in step (25) for opening the one of said valves which is associated with said data "1" checked in step (25);

(27) checking to see if there is a said data "0" in step (20); and

(28) generating a third valve control signal if said data "0" is present in step (27) for closing the one of said valves which is associated with said data "0".

* * * * *